US010028606B1

(12) United States Patent
Ritchie

(10) Patent No.: US 10,028,606 B1
(45) Date of Patent: Jul. 24, 2018

(54) PROTECTED UNMANNED VEHICLE DELIVERY RECEPTACLE

(71) Applicant: John K. Ritchie, San Jose, CA (US)

(72) Inventor: John K. Ritchie, San Jose, CA (US)

( * ) Notice: Subject to any disclaimer, the term of this patent is extended or adjusted under 35 U.S.C. 154(b) by 0 days.

(21) Appl. No.: 15/587,115

(22) Filed: May 4, 2017

(51) Int. Cl.
| | | |
|---|---|---|
| *A47G 29/12* | (2006.01) | |
| *B64C 39/02* | (2006.01) | |
| *G07C 9/00* | (2006.01) | |
| *A47G 29/14* | (2006.01) | |

(52) U.S. Cl.
CPC ......... *A47G 29/12* (2013.01); *A47G 29/1214* (2013.01); *A47G 29/141* (2013.01); *B64C 39/024* (2013.01); *G07C 9/00896* (2013.01); *B64C 2201/128* (2013.01)

(58) Field of Classification Search
CPC .............. A47G 29/12; A47G 29/12097; A47G 29/1214; A47G 2029/1226; A47G 29/141; A47G 2029/148; A47G 2029/149; A47G 29/16; B64C 39/024; B64C 2201/128; G07C 9/00896; B64F 1/32
USPC ...................... 232/45, 19, 17, 30–32, 34–37; 340/568.1, 569, 5.73; 70/63, 158; 200/61.63; 244/114 R
See application file for complete search history.

(56) References Cited

U.S. PATENT DOCUMENTS

| | | | | |
|---|---|---|---|---|
| 5,774,053 A * | 6/1998 | Porter | ................... | A47G 29/141 232/19 |
| 6,483,433 B2 * | 11/2002 | Moskowitz | .......... | A47G 29/141 232/34 |
| 7,182,246 B1 * | 2/2007 | Sievel | .................... | A47G 29/22 232/45 |
| 7,256,691 B2 * | 8/2007 | Awobue | ............. | A47G 29/1214 232/17 |
| 9,211,025 B1 | 12/2015 | Elhawwashy | | |
| 9,244,147 B1 | 1/2016 | Soundararajan et al. | | |
| 9,567,081 B1 | 2/2017 | Beckman et al. | | |
| 2001/0045449 A1 * | 11/2001 | Shannon | .............. | A47G 29/141 232/19 |
| 2015/0158599 A1 | 6/2015 | Sisko | | |
| 2015/0175276 A1 * | 6/2015 | Koster | ...................... | B64F 1/32 244/114 R |
| 2015/0183528 A1 | 7/2015 | Walsh et al. | | |
| 2016/0033966 A1 | 2/2016 | Farris et al. | | |

(Continued)

FOREIGN PATENT DOCUMENTS

WO    WO 2016/094067    6/2016

*Primary Examiner* — William Miller
(74) *Attorney, Agent, or Firm* — Haynes and Boone, LLP

(57) ABSTRACT

A system for the delivery and secure receipt of packages from unmanned vehicles to improve security and protection of the packages upon delivery. A UAV receptacle provides a water-protected interior to protect a package. The UAV receptacle includes a door in one side that allows a reception tray to extend out and back in, and which locks to protect the package so received. The UAV receptacle detects a drone in proximity. Upon confirming that delivery is for the UAV receptacle, the reception tray extends to a reception position. A sensor detects the package on the reception tray upon delivery from the drone. The reception tray is of a mesh material to reduce water retention. The UAV receptacle retracts the reception tray and closes a door to seal the package within the UAV receptacle. The UAV receptacle may notify user devices that the package has been received.

13 Claims, 10 Drawing Sheets

(56) References Cited

U.S. PATENT DOCUMENTS

| | | |
|---|---|---|
| 2016/0157653 A1 | 6/2016 | Manitta |
| 2016/0257423 A1* | 9/2016 | Martin .................... B64F 1/00 |
| 2017/0091710 A1* | 3/2017 | Van Dyke .......... G06Q 10/0835 |
| 2017/0116568 A1* | 4/2017 | Pleis .................. G06Q 10/0832 |
| 2017/0203857 A1* | 7/2017 | O'Toole ................... B64F 1/32 |

* cited by examiner

PROTECTED UNMANNED VEHICLE DELIVERY RECEPTACLE

TECHNICAL FIELD

The present description relates to unmanned vehicles, and more specifically, to apparatus, systems, methods, and machine-readable media for the delivery and secure receipt of packages from unmanned vehicles to improve security and protection of the packages upon delivery.

BACKGROUND

Delivery of packages by unmanned vehicles, such as unmanned aerial vehicles also referred to at times as "drones," is a fledgling field with many challenges that remain unsolved in large part. One challenge that has not been adequately resolved is how to ensure safe receipt of a package to the intended recipient. In practice currently (i.e., in non-drone deliveries), packages must either be signed as accepted by the recipient or are left somewhere at the place of delivery. The former is required as the best means of security currently, while the latter often is accompanied by attempts to hide the package from notice.

Yet theft of delivered packages remains a problem for existing channels of delivery, let alone possible forthcoming channels that involve delivery by drones of some sort. Some have attempted to solve this problem with delivery boxes that lock and cannot be accessed without a code. However, these approaches remain subject to other problems, such as adequate protection of the inside of the delivery box (and, thus, received packages) from inclement weather. Further, the prospect of these approaches remain limited in their interfacing with delivery drones and other systems to ensure the avoidance of unnecessary false positives as well as false negatives.

Accordingly, the potential remains for improvements that facilitate the delivery of packages by unmanned vehicles in a manner that provides (at least) sufficient security to the packages delivered, better protection upon delivery from inclement weather, and proper delivery procedures.

BRIEF DESCRIPTION OF THE DRAWINGS

The present disclosure is best understood from the following detailed description when read with the accompanying figures. In accordance with the standard practice in the industry, various features are not drawn to scale. In fact, the dimensions of the various features may be arbitrarily increased or reduced for clarity of discussion.

DETAILED DESCRIPTION

Figure 1:
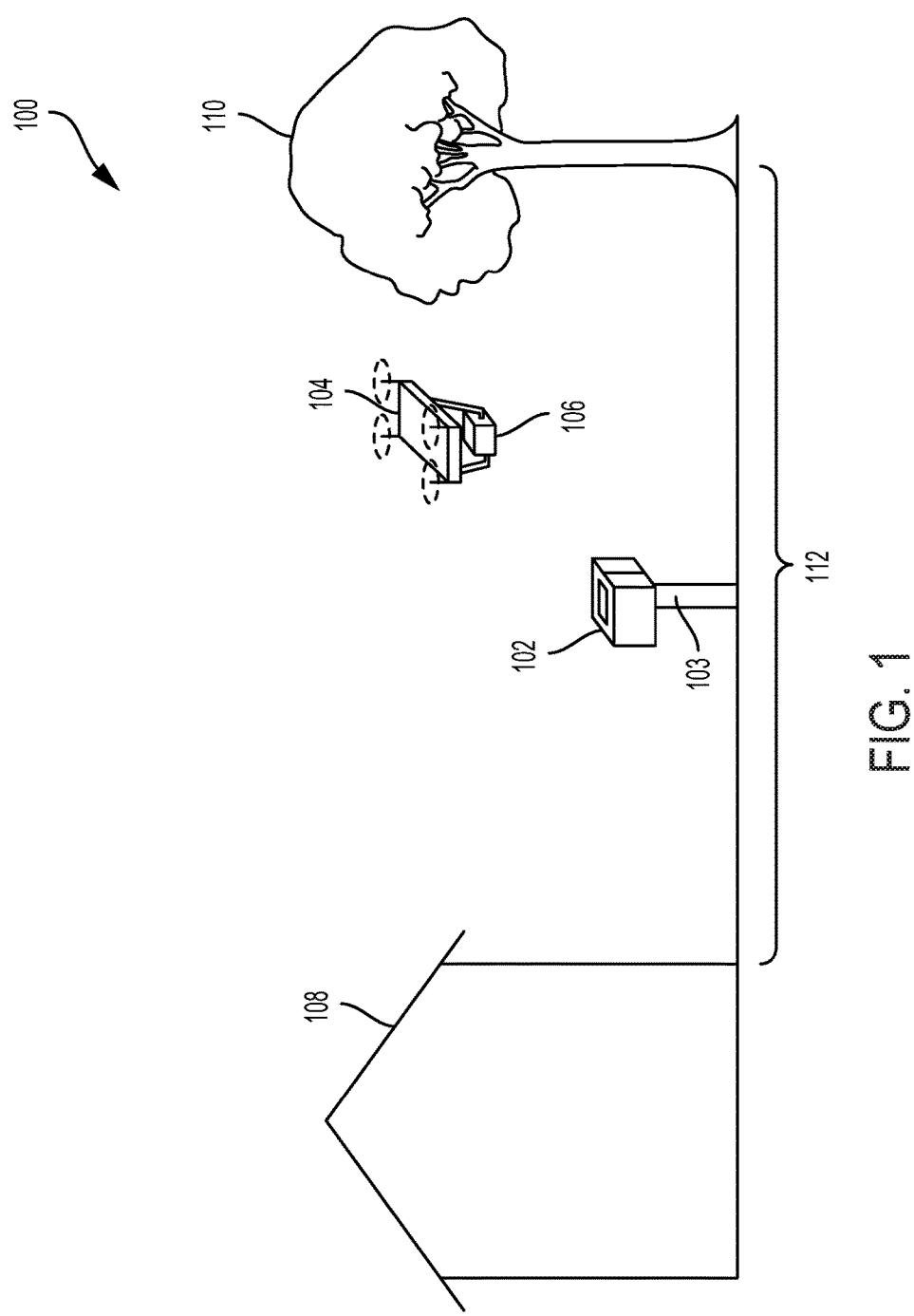
FIG. 1 illustrates an exemplary unmanned vehicle delivery environment according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for the delivery and secure receipt of packages from unmanned vehicles to improve security and protection of the packages upon delivery.

According to embodiments of the present disclosure, an unmanned vehicle apparatus (referred to as a UAV receptacle for discussion herein) may include multiple sides formed to provide a water-protected interior designed to protect a package. The UAV receptacle may include a door in one side that allows a reception tray to extend out (in a horizontal direction, perpendicular to a vertical axis of the UAV receptacle) and back in, and which locks to protect the package so received.

In particular, when an unmanned vehicle such as a drone approaches the UAV receptacle to deliver a package, the UAV receptacle may detect the drone as it approaches a proximity of the UAV receptacle. Upon confirming that delivery is intended for the UAV receptacle, the UAV receptacle may cause the reception tray to extend to a reception position and, upon detecting by a sensor on the reception tray that a package has been delivered from the drone, retract the reception tray and close a door to seal the package within the UAV receptacle.

In response thereto, the UAV receptacle may notify one or more user devices associated with the UAV receptacle that the package has been received. In response, the user may access the contents of the UAV receptacle by either entering a command to unlock the receptacle via the app on the user device or via an entry to a user interface on the UAV receptacle itself. The UAV receptacle may then unlock to allow access to the package within.

In some embodiments, the UAV receptacle may further be coupled to an expansion container that may receive and temporarily store multiple packages for the user. For example, upon receipt of a package, the UAV receptacle may push the package through an opening connecting the UAV receptacle interior to an interior of the expansion container, thereby freeing up the reception tray to be ready to receive another package should another delivery be scheduled before the user retrieves the prior delivered package.

As a result, embodiments of the present disclosure improve upon the delivery of packages by unmanned vehicles in a manner that provides (at least) sufficient security to the packages delivered, better protection upon delivery from inclement weather, and proper delivery procedures.

FIG. 1 illustrates an exemplary unmanned vehicle delivery environment 100 (also generally referred to as the "environment 100") according to aspects of the present disclosure. For example, as illustrated, the environment 100 may include an exemplary unmanned vehicle delivery receptacle 102 (also referred to as a "UAV receptacle 102" or a "drone drop box 102"), unmanned aerial vehicle 104 (also referred to at times as a "drone 104," "UAV 104," or "unmanned vehicle 104"), package 106 (whether a single or multiple packages), building 108 (which may be a residential building, a commercial building, etc. without departing from the scope of the present disclosure), and one or more obstructions 110 (illustrated as a tree in FIG. 1, though any of a variety of obstructions may be contemplated as represented by the tree in FIG. 1 as well). The environment 100 may include many other aspects, but these are focused on for purposes of discussing embodiments of the present disclosure.

The UAV receptacle 102, according to embodiments of the present disclosure, provides a more secure mechanism by which to receive packages from UAVs 104 in an unmanned vehicle delivery system and will be discussed in more detail with respect to the other figures herein. As illustrated, the UAV receptacle 102 is secured on top of a post 103. The post 103 may generally be any material and form to offset the UAV receptacle 102 from the general surface of the ground, and may for example have a height on the order of 2-4 feet (as just an example). The height from the ground may be a variety of heights—typically of sufficient height to place the UAV receptacle 102 at approximately a waist level of a human user of the UAV receptacle 102.

The UAV receptacle 102 may secure to the post 103, such as by bolting, bonding, welding, gluing, nailing, etc. (or some combination thereof). Further, the post 103 may itself be secured to the ground to prevent attempts from stealing the UAV receptacle 102 while still secured to the post 103. Some examples include bolting the post 103 to a portion of concrete, either previously installed (e.g., as part of a patio structure by a building 108) or installed expressly for the post 103, a wooden structure, etc. The UAV receptacle 102 and the post 103 may be provided in a prepackaged set from a vendor for ease in customer self-installation, or for professional installation.

As illustrated in FIG. 1, the UAV receptacle 102 may be installed with a minimum distance 112 separating the UAV receptacle 102 from any obstructions 110 and buildings 108. In some examples, the minimum distance may be on the order of 4 to 8 feet (i.e., a 4 to 8 foot radius of clearance around the UAV receptacle 102). That is exemplary only. The size of the minimum distance 112 may be keyed to the size of the UAV receptacle 102, which in turn may be keyed to the maximum size of package designed to be received. For example, the UAV receptacle 102 may be designed to receive a size of package so as to accommodate package types that are most common—e.g., packages on the order of 10-12 inches in length, height, and/or width. Thus, UAV receptacles 102 dimensioned to receive these smaller packages may have a smaller minimum distance 112, while UAV receptacles 102 dimensioned to receive larger average package sizes may have larger minimum distance 112 to neighboring obstructions 110/buildings 108.

The drone 104 illustrated in FIG. 1 is an unmanned aerial vehicle according to embodiments of the present disclosure. The drone 104 may be configured to carry the package 106 from a source to the target destination of the UAV receptacle 102 associated with a user of a system for unmanned vehicle delivery. The drone 104 may include circuitry, systems, software, and protocols designed to enable the drone 104 to receive instruction from a delivery source to receive/retrieve the package 106, depart from a delivery source location (e.g., a warehouse, a delivery vehicle that itself may also be manned or unmanned, for example a truck en route to delivery and dispatched for the so-called "last mile" to the target location of the user), locate the target UAV receptacle 102 (e.g., by charting and following a course to a registered building 108 of the user associated with a given package 106), and travel to the location.

Further, the drone 104 may have one or more communications systems configured to communicate with the communications systems of the UAV receptacle 102, such as Wi-Fi, Zigbee, near field communications (NFC), Bluetooth, Bluetooth Low Energy, Cellular, etc. (e.g., other types, a combination of types, etc.). Thus, as the drone 104 comes within a proximity of the UAV receptacle 102, the drone 104 and the UAV receptacle 102 may detect one another and coordinate delivery of the package 106 in a secure, safe, and protected manner. For example, in some embodiments the drone 104 may utilize an active RF source to repeatedly interrogate its surroundings. The UAV receptacle 102 may have a passive RF tag to respond to such interrogation and thereby establish communication in a manner that conserves power for at least the UAV receptacle 102 (or, conversely, the UAV receptacle 102 may be the active interrogator and the drone 104 the passive listener).

As another example, a back-end control system for the drone 104 may, as a result of tracking the drone 104 during a delivery mission, detect when the drone 104 is within a predetermined vicinity of the delivery location (i.e., recorded location of the building 108 associated with the user). As a result of the detection, the back-end control system for the drone 104 may send a notification (e.g., via one or more networks) to the UAV receptacle 102 to start scanning its environment to detect the presence of the drone 104 for delivery of a package.

As another alternative or additional example (e.g., in combination with the above or other proximity detection mechanism), the package 106 may have a passive or active RF tag to either be scannable (passive) or interrogate (active) its environment. As yet another example, in embodiments where the UAV receptacle 102 and the drone 104 are configured to detect each other's presence via any of the above mechanisms (or other similar types), the UAV receptacle 102 may further include challenge/response protocols to confirm that delivery is intended for that particular UAV receptacle 102 on behalf of a target user of the same receptacle.

For example, upon detecting the presence of a drone 104 within a minimum proximity of the UAV receptacle 102, the UAV receptacle 102 may additionally send a challenge (e.g., a query or confirmation signal) to the drone 104 to determine whether the drone 104 is within the proximity to deliver to that particular UAV receptacle 102 or is merely passing by en route to a different delivery location). In response, the drone 104 may either transmit a confirm or deny signal, depending on the status with respect to the particular user, or provide no answer which may have a default understanding (e.g., no answer means a confirmation or a no answer means no confirmation, depending upon an agreed protocol). These are just a few examples of how the UAV receptacle 102 and the drone 104 may establish communication to coordinate delivery of a package 106 to the UAV receptacle 102 according to embodiments of the present disclosure.

Once it is understood that the UAV receptacle 102 is the device associated with the targeted recipient user (e.g., at the proper location of building 108 associated with the targeted recipient user), and the drone 104 is within the appropriate detected proximity, the UAV receptacle 102 opens doors (either one or multiple) on a side of the housing of the UAV receptacle 102. From within the UAV receptacle 102, a reception tray is actuated out to a receipt position. The receipt position is illustrated in an exemplary embodiment in FIG. 4, as discussed further below. The reception tray may be designed and constructed to be a mesh or other material that allows fluids to pass through, thereby increasing resilience of the UAV receptacle 102 to rain and other inclement weather (and, therefore, better protecting the package 106 from that inclement weather).

In particular, by including a reception tray in the UAV receptacle 102 that extends out a side of the device, instead of merely opening a space in the top of the device, precipitation is accorded less opportunity to accumulate within the UAV receptacle 102 during a delivery run (e.g., because the precipitation from inclement weather can only enter through an opening in the side, instead of easier entrance through an opening in the top of the UAV receptacle 102). Thus, the package 106, as well as the interior of the UAV receptacle 102, are better protected from any damaging effects of standing water from precipitation during delivery (aside from any precipitation that accumulates on the package 106 itself while out with the drone 104 for the delivery).

The reception tray may have one or more sensors that detects placement of the package 106 by the drone 104. Further or alternatively, the UAV receptacle 102 may communicate with the drone 104 and receive an indication from the drone 104 that the package 106 has been delivered (which may function as a confirmation in embodiments where the reception tray also includes one or more sensors to detect presence of a package 106 placed thereon). Once the UAV receptacle 102 receives the package 106 (e.g., by a detection signal and/or confirmation signal), the reception tray is actuated back to storage position within the housing of the UAV receptacle 102 and the door is shut again, and in embodiments locked to protect against theft.

The UAV receptacle 102 may, in addition to one or more communications systems that communicate with drones 104, have one or more communications systems to communicate with other entities associated with the package (which may be the same or different than those to communicate with drones 104). For example, the UAV receptacle 102 may further connect to a network system of the user associated with the UAV receptacle 102 and/or the building 108 to send one or more signals to interested parties. As a result, the UAV receptacle 102 may generate a receipt signal that is transmitted via the network to one or more registering/interested parties. For example, the user may receive a notification from the UAV receptacle 102 according to the receipt signal asserted/generated once the package 106 is received from the drone 104. This may take the form of a direct signal sent from the UAV receptacle 102 to a receiving device associated with the user (e.g., direct being either to the receiving device, such as a computer, phone, tablet, etc., without intervening network nodes, or via one or more network nodes but not requiring a third party server transaction first).

As another example, the delivery entity that has use and/or ownership of the drone 104 (e.g., an online retailer), and/or the providing entity that caused delivery to occur, may also receive a confirmation signal from the UAV receptacle 102 confirming that the package 106 has been received (e.g., via the UAV receptacle 102 connecting to the user's network or by the UAV receptacle 102 communicating a confirmation to the drone 104 before the drone 104 passes out of proximity and/or communications range from the UAV receptacle 102). In turn, the delivery entity may send its own confirmation of delivery to a device associated with the user, and/or pay a fractional amount to a distributor of the UAV receptacle 102.

The user of the UAV receptacle 102, having received notification of receipt of the package 106 (e.g., from the UAV receptacle 102 via the user's network and/or from the delivery entity), may then proceed with accessing the contents of the UAV receptacle 102. For example, the user may enter a code to a keypad, use a key, submit to a biometric scan, etc. at the UAV receptacle 102. In other embodiments, the user may enter a command into a remote device (e.g., via an app of a mobile device) and remotely unlock the UAV receptacle 102 for a person to access the contents on behalf of the user. Access to the interior of the UAV receptacle 102 may be via the same door, with the reception tray extending for access, or via a separate access door/hatch on another side of the housing of the UAV receptacle 102. In yet other embodiments, an expansion container securely attached to the UAV receptacle 102 may be accessed via a door to retrieve the package 106.

Figure 2:
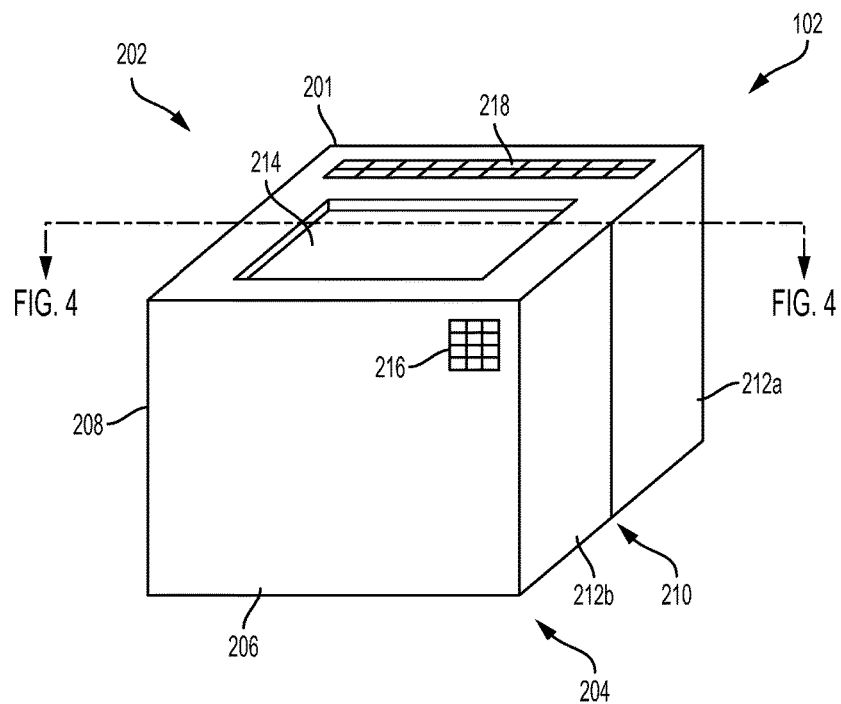
FIG. 2 is a block diagram of a perspective view of an exemplary unmanned vehicle delivery receptacle according to aspects of the present disclosure.

FIG. 2 provides a more detailed block diagram of an exemplary UAV receptacle 102, at a top perspective view, according to aspects of the present disclosure. The UAV receptacle 102 illustrated in FIG. 2 is an example of the UAV receptacle introduced in FIG. 1. The UAV receptacle 102 includes a housing 202. The housing 202 has a top 201, a bottom 204, a side 206 adjacent to the side 210 having doors 212*a* and 212*b*, another side 220 adjacent the side 210, and a side 208 opposite the side 210. Although illustrated as generally square/cube in form, the UAV receptacle 102 may assume a variety of dimensions (including rounded edges instead of abrupt edges) and shapes including rectangular, ellipsoidal, spherical, etc., without departing from the scope of the present disclosure.

On the side 210, the doors 212a, 212b are illustrated as being separated along a vertical axis extending from the top 201 to the bottom 204 of the housing 202. The doors 212a, 212b may assume alternative configurations, including being separated along a horizontal axis extending from the sides 206 to 220, and/or have more or fewer total doors (e.g., just one door that swings out from the housing 202 when opening or that slides out with the reception tray, more doors to result in smaller sizes for each, etc.).

The housing 202 may further include one or more security access mechanisms 216, illustrated as a keypad in FIG. 2. These may be included to enable a user of the UAV receptacle 102 to access one or more packages 106 stored securely within the housing 202 according to embodiments of the present disclosure. Though illustrated on side 206, the security access mechanisms 216 may be included on any other side, whether all together or spread among the sides (and/or top 201), etc.

As further illustrated in FIG. 2, the top 201 of the housing 202 may include a pickup pad 214. The pickup pad 214 may be slightly recessed from the rest of the top 201, for example to aid a package 106 from being blown from the top 201. In other examples, the pickup pad 214 may be slightly protruding from the rest of the top 201 for added prominence, while in other examples the pickup pad 214 is a logically defined location on the top 201 that is otherwise substantially flush with the rest of the top 201 (and, in other embodiments, left off from the housing 202). Although illustrated as approximately flat, the top 201 may in some embodiments have a curvature extending from an apex around the center of the top 201 towards lower edges (e.g., an elliptical shape) that allows precipitation to run in many directions away from the apex center. Further, the pickup pad 214 specifically may include one or more slots or drainage holes which may connect to one or more channels running to an outside of the housing 202, e.g. outlet vents on the side closest to the pickup pad 214 (side 206 in the example of FIG. 2). A raised bed may also be included to further prevent water soaking in the pickup pad 214.

The pickup pad 214 may be sized according to the estimated average length and width of the type of package 106 the particular UAV receptacle 102 has been designed to accommodate (e.g., on the order of 10 to 12 inches for 5 pound or less average-sized packages). The pickup pad 214 may include one or more sensors to detect a presence of a package 106 placed thereon. This may occur, for example, where the package 106 is a specialized package used for drone deliveries to be more durable and reusable (or just a regular box that is still intended to be reused/recycled), and/or where the user intends to send its own package 106 to another destination that is facilitated by the delivery entity. In yet another alternative example where the user is sending its own package 106, the package 106 may instead be placed within the housing 202 on the reception tray. Combined with that, the user may notify the delivery entity (e.g., via an app of a user device) of the pickup, make payment or arrange for payment, etc., so that the UAV receptacle 102 may also be used to source deliveries via drone 104 to other destinations.

Returning to the pickup pad 214 in particular (which may also be used to source deliveries, though this is not secure, and thus may simply be used to return used packages 106 after their contents are removed), to avoid false positives, a controller in the housing 202 may delay alerting a pickup system (whether the delivery entity that had facilitated sending the package 106 or some third party recycling service, etc.) until it receives an additional input identifying the package 106 for pickup. This may include a user input that the controller either awaits or that it prompts from the user. Thus, the user may input a command via the security access mechanisms 216 and/or some other user interface of the housing 202 or the user's user device (via an app, for example). Thereafter, a pickup request may be signaled from the user's network to the appropriate retrieving party (whether the delivery entity or third party, etc.). The signal may be generated from the app of the user's device, from the controller of the UAV receptacle 102, some combination of both, etc.

The housing 202 may further include a solar array 218 to provide power to one or more batteries of the housing 202 (e.g., to provide power to actuators associated with the doors 212a, 212b, the controller, etc.). The solar array 218 may be generally flush (e.g., integrated with) the surface of the top 201 or raised therefrom (e.g., for customizable directing towards an ideal azimuth and elevation for maximizing harvesting of solar energy). The exact location/area on the top 201 (or separate from the housing 202 and coupled thereto by one or more cables and/or one or more arms, for example) may vary and is not limited to the location/area illustrated in FIG. 2 (or FIGS. 3D, 4, 5A, 5D).

Figure 4:
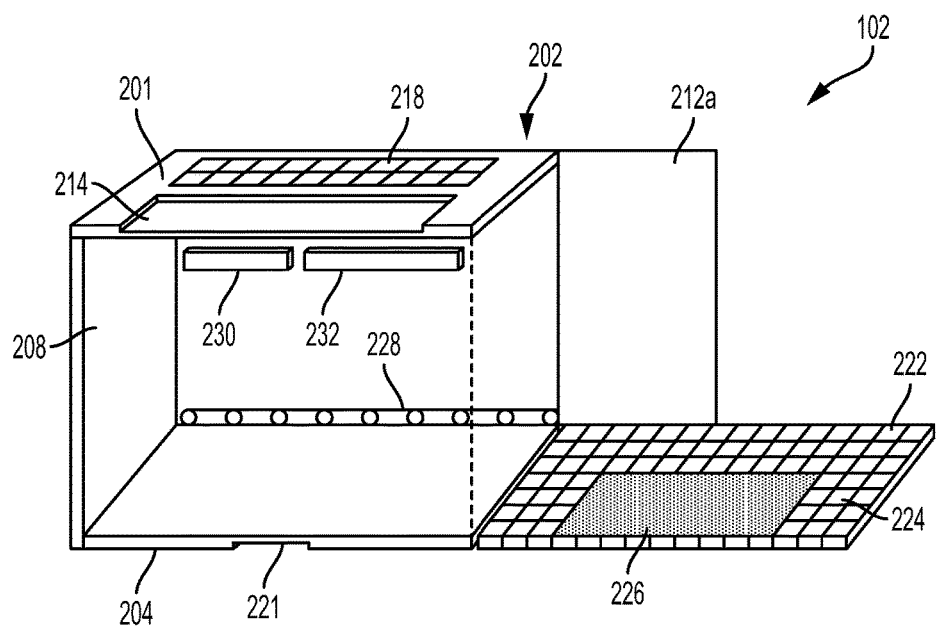
FIG. 4 is a block diagram of a cross-sectional view of an exemplary unmanned vehicle delivery receptacle according to aspects of the present disclosure.

A cross section is also illustrated in FIG. 2 extending horizontally across the housing 202 from a center of the side 210 where the doors 212a, 212b are located to the rear side 208 of the housing 202 (rear referring here simply to the side 208 that is opposite the side with the doors 212a, 212b). The cross section is illustrated in FIG. 4 to detail some of the contents of the interior of the housing 202.

Figure 3A:
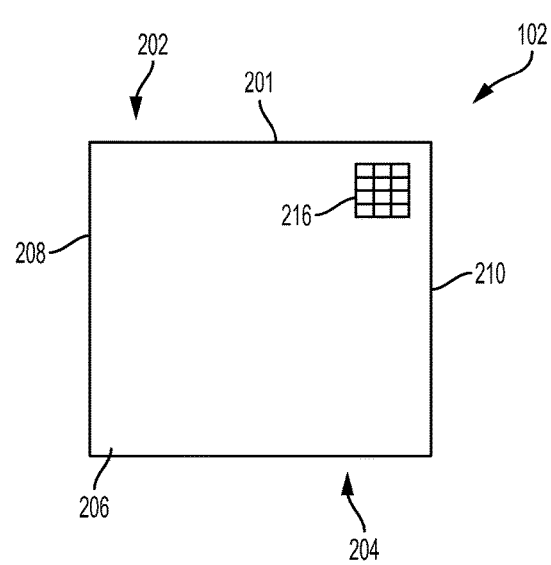
FIG. 3A is a block diagram of a side view of an exemplary unmanned vehicle delivery receptacle according to aspects of the present disclosure.

FIG. 3A illustrates a side view of the UAV receptacle 102 according to aspects of the present disclosure. In particular, FIG. 3A illustrates the side 206 of the housing 202. The side 206 may be one of the sides adjacent to the side 210 having doors 212a and 212b (e.g., from a top view of the housing 202, the side being to the right of the side 210, though it may be the other side instead).

The side 206 as illustrated includes the one or more security access mechanisms 216, illustrated as a keypad in this example. These may be included to enable a user of the UAV receptacle 102 to access one or more packages 106 stored securely within the housing 202 according to embodiments of the present disclosure. Though illustrated as being simply a keypad, the one or more security access mechanisms 216 may be a manual keypad, a touchscreen keypad, a combination of a keypad and a voice system, and/or a display (whether touchscreen or not), etc.

Figure 3B:
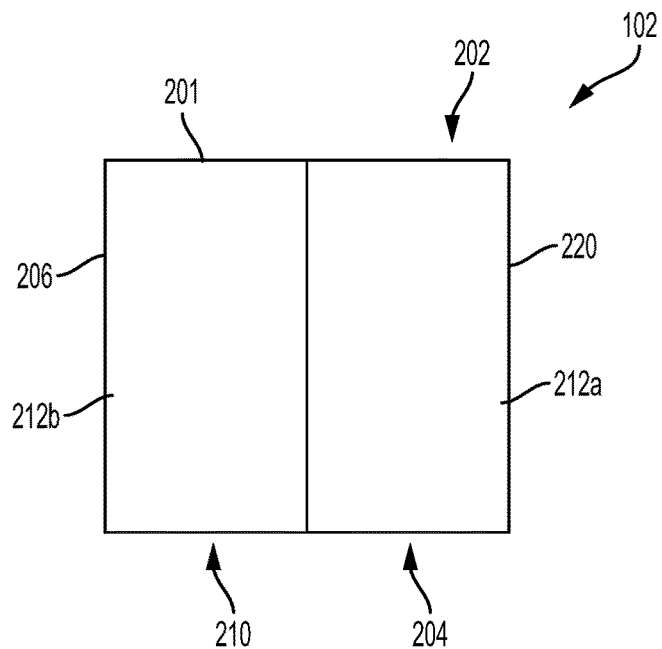
FIG. 3B is a block diagram of a side view of an exemplary unmanned vehicle delivery receptacle according to aspects of the present disclosure.

FIG. 3B is a block diagram of a side view of the UAV receptacle 102 according to aspects of the present disclosure. FIG. 3B illustrates the side 210 that includes the doors 212a, 212b. Adjacent the side 210 are the sides 206 discussed above with respect to FIG. 3A and the side 220.

The doors 212a, 212b of side 210 may define a full area of the side 210. Alternatively, the doors 212a, 212b may occupy an area that is less than a full width and height of the side 210, albeit still sized sufficiently to accommodate a package 106 having target dimensions. As noted with respect to FIG. 2, though the doors 212a, 212b are illustrated as being separated along a vertical axis extending from the top 201 to the bottom 204 of the housing 202, the doors 212a, 212b may assume alternative configurations. Some alternatives include being separated along a horizontal axis extending from the sides 206 to 220 instead, and/or have more or fewer total doors. For example, in embodiments with fewer doors, a single door 212 may be used that swings out from the housing 202 when opening (whether hinged at the interface with the top 201, or at the interface with the bottom 204, or one of the sides 206, 220). As another example, in embodiments with more doors, there may be three doors, four doors, or more that open out to allow the reception tray to extend out to a reception position and back to a storage position within the housing 202, etc.

Figure 3C:
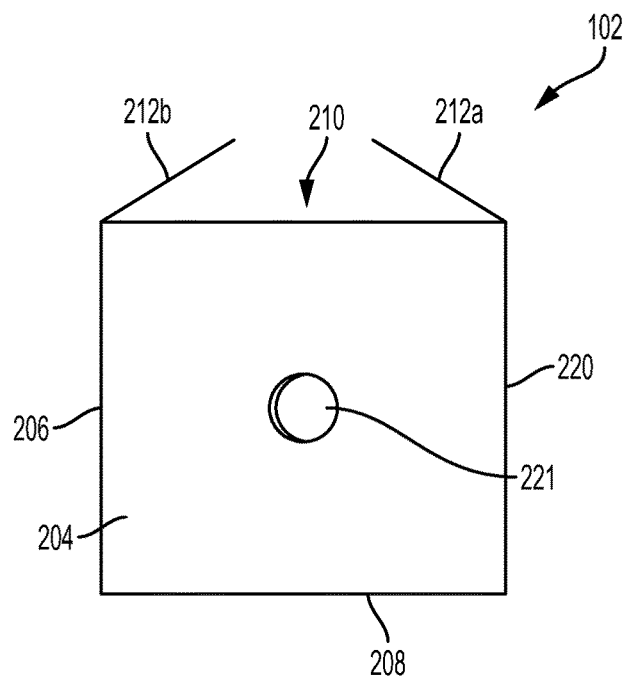
FIG. 3C is a block diagram of a bottom view of an exemplary unmanned vehicle delivery receptacle according to aspects of the present disclosure.

FIG. 3C is a block diagram of a bottom view of the UAV receptacle 102 according to aspects of the present disclosure. FIG. 3B illustrates the bottom 204 of the housing 202. The bottom 204 may include a recess 221 sized to accommodate the post 103 introduced with respect to FIG. 1 above. The recess 221 may include a securing mechanism, such as a lock, a bolt, an adhesive, etc. to couple the housing 202 to the post 103 in a manner that prevents theft of the housing 202. In alternative embodiments, the recess 221 may not be physically recessed from the rest of the surface of the bottom 204, but instead be a defined region to which a post 103 may couple or be permanently attached.

Figure 3D:
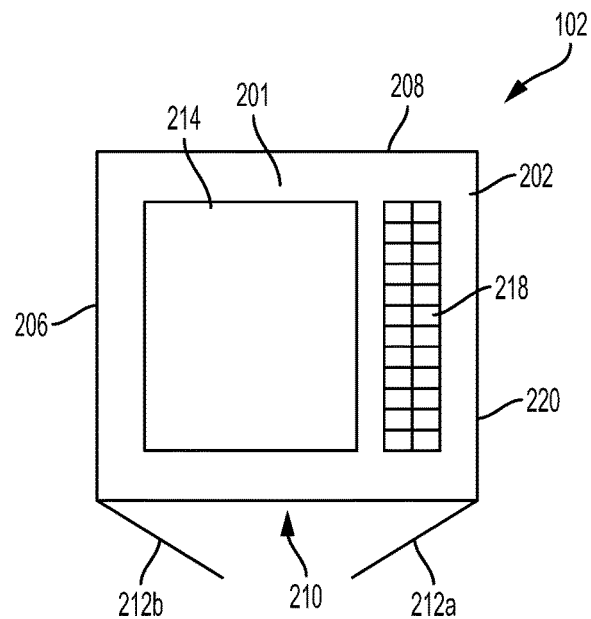
FIG. 3D is a block diagram of a top view of an exemplary unmanned vehicle delivery receptacle according to aspects of the present disclosure.

Turning now to FIG. 3D, a block diagram is illustrated of a top view of the UAV receptacle 102 according to aspects of the present disclosure. FIG. 3D illustrates the top 201 of the housing 202.

As noted with respect to FIG. 2, the top 201 may include regions defined for the pickup pad 214 and the solar array 218. As illustrated in FIG. 3D, the doors 212a, 212b are in a slightly open position, representing either the doors 212a, 212b actuating to an open position for the reception tray within the housing 202 to actuate to a reception position or actuating to a shut position for the reception tray in a storage position within the housing 202.

FIG. 4 is a block diagram of a cross-sectional view of the UAV receptacle 102 according to aspects of the present disclosure. In particular, FIG. 4 provides a cross-sectional view of the housing 202 introduced in FIG. 2, extending from the side 210 having the doors 212a, 212b toward the rear side 208 (that is opposite the side 210). Although illustrating the embodiment with two doors 212a, 212b, the cross-section shown in FIG. 4 may be generally the same for embodiments with other door configurations, e.g. a single door (whether attached to the reception tray or in an actuated relationship with the housing 202) or multiple doors. FIG. 4 also illustrates a reception tray 222 on mounts 228 (e.g., roller mounts).

The cross-sectional view shown in FIG. 4 is from the perspective view of FIG. 2 along the axis drawn in FIG. 2 (and labeled "FIG. 4"). Thus, in FIG. 4, half of the pickup pad 214 is illustrated in the cut-out from the top 201 followed by the solar array 218 extending towards the far side of the housing 202. Further, half of the recess 221 on the bottom 204 is illustrated in the cutout of FIG. 4 as well. In the example of FIG. 4, the doors 212a, 212b are in the open position and the reception tray 222 is in the receipt position (i.e., fully extended out of the housing 202). In this configuration, the UAV receptacle 102 is ready to receive a package 106.

The reception tray 222 may be constructed from a mesh material 224 that has a porosity sufficient to allow precipitation to at least drip through after contact, while bound together closely enough to support receipt of a package 106 (e.g., the weight of the package 106, both standing weight as well as the added force of a drop of the package 106 from some approximate height from the drone 104, such as in the range of 16 inches to 32 inches to name just one example—this could be in the range of 40-60 pounds, though other ranges are also possible and envisioned both greater and less than that). The mesh material 224 may be composed of any of a variety of materials, including some form of metal such as steel, aluminum, or some other metal/alloy, carbon fiber, polymer (e.g., plastics), etc.

The reception tray 222 may also include a sensor 226 that detects the presence of a package 106. For example, the sensor 226 may include a weight sensor, a force sensor, a capacitive sensor, an image sensor, some combination thereof, or other sensor that detects presence of a package 106. The sensor 226 may be a pad placed on top of the mesh material 224 and adhered thereto (e.g., via adhesive or some mechanical connection) or be integrated with the mesh material 224 (e.g., woven or placed between layers of the mesh material 224 to name just a few examples).

There are several alternatives to the configuration of the reception tray 222. In addition to the example illustrated in FIG. 4, the reception tray 222 may further include small walls on sides of the reception tray 222 so as to assist in preventing packages 106 dropped to the reception tray 222 from bouncing off upon drop from the drone 104. Such walls may be sized to be some percentage of the overall height of the housing 202, for example less than half the height (e.g., 4 inches as just one non-limiting example), to almost the full height from bottom 204 to top 201. Alternatively or in addition, the reception tray 222 may have different configurations than the flat configuration illustrated in FIG. 4. For example, the reception tray 222 may itself have an indentation such that the outer edges of the reception tray 222, in the orientation of the housing 202, are further away from the bottom 204 than a central, lowered portion of the reception tray 222. The lowered portion in such embodiments may be sized to be approximately flat for some minimum length and width to facilitate better receipt of packages 106 upon drop from a drone 104, e.g. corresponding to the length and width of the sensor 226, with sloped portions on each of the sides of the reception tray 222 up towards the higher outer edges. This may be instead of the walls or in combination therewith.

Returning to the sensor 226, it may be battery-operated independent of other aspects of the housing 202 or alternatively be wired or wirelessly (for power) connected to other components of the housing 202 (e.g., through the mesh material 224 and via the mounts 228). Further, the output of the sensor 226 may be conveyed to other components of the housing 202 via wired or wireless connection(s). For example, once the sensor 226 is triggered upon sensing a package 106, the sensor 226 may assert what is referred to herein as a detection signal (which may assume the form of one or more signals of a length appropriate to identify the detection, ranging from assertion of a single bit to some string of bits identifying information output from the sensor 226 without departing from the scope of the present disclosure).

Other components within the housing 202 include a controller 230 and a power source 232. Although illustrated as both being located on the same side of the housing 202, they may be located on different sides than each other (including attached to the interior side of the top 201 or, if of a sufficiently low profile, laid out below the traversal region of the reception tray 222). The controller 230 may include at least one transceiver, at least one processor, and at least one memory as will be discussed in more detail below with respect to FIG. 6. The controller 230 may communicate with the different sensors associated with the housing 202, including for example associated with the sensor 226 of the reception tray 222, a sensor associated with the pickup pad 214, the security access mechanisms 216, and any other sensors of the housing 202. Further, the controller 230 may be in communication with the solar array 218 to send commands thereto and receive data therefrom.

According to embodiments of the present disclosure, the controller 230, upon a proximity signal being asserted in response to a drone 104 coming within a predetermined range of the UAV receptacle 102 (e.g., based on detection/communication with the drone 104 by the transceiver of the controller 230), sends a command to actuate the doors 212a, 212b to the open position, and sends a command to actuate the reception tray 222 from a storage position to a reception position. Where the door 212 is part of the reception tray 222, then the commands may be a single command to actuate the reception tray 222. The controller 230, upon receipt of a detection signal from the sensor 226, may command the reception tray 222 to actuate and retract back to the storage position and also command the doors 212a, 212b to actuate to the shut position (which may be accomplished by retracting the reception tray 222 where the door is part of the reception tray 222).

Further according to embodiments of the present disclosure, the controller 230 (via the transceiver thereof), may notify one or more subscribing users of the UAV receptacle 102 of the receipt of a package 106 upon closing the door 212 (e.g., doors 212a, 212b in the example of FIG. 2). This notification may again be performed via the transceiver of the controller 230. This is addressed in more detail with respect to FIG. 6 below. Further, alternatively or in addition, the housing 202 may include one or more visual indicators (e.g., lights, screens, etc.) to physically alert a user of the presence of a package 106 therein.

The power source 232 may be any available power source that can provide sufficient power to the components of the housing 202 over a desired period of time. For example, the power source 232 may be a collection of one or more rechargeable batteries (e.g., lithium batteries, wet-cell batteries, dry-cell batteries, etc.). The power source 232 may, in communication with the controller 230 and the solar array 218, periodically receive an inflow of power generated from the solar array 218 when the solar array 218 is active (either from solar input being available, the controller 230 allowing charging to occur, or some combination thereof). The power source 232 may also be or include a mains power source that may include components to convert an alternating current voltage input (e.g., plugged into a socket from a user's building) into a direct current voltage regulated for use by the components of the housing 202.

In some embodiments, the power source 232 may actually include two or more distinct power sources (e.g., multiple cell packs as just one phrase to describe the various types of power supplies available) that operate in cooperation under the controller 230 to power the actuators, sensors, and other components of the housing 202. For example, a first cell pack of the power supply 232 may power the components of the housing 202. The controller 230 may monitor the status of the power supply 232 and detect when the first cell pack falls below a supply threshold. In response, the controller 230 may direct power to be supplied instead from a second cell pack (which may have been replaced or recharged). After the switch, the first cell pack may begin recharging or be replaced.

The controller 230 may signal the switch occurring to the subscribing user (e.g., via an app on the user's device) or may wait to signal the user unless and until all of the cells of the power supply 232 (or multiple power supplies 232) fall below a threshold that will require the user's attention to prevent loss of operation of the UAV receptacle 102. In embodiments where the power supply 232 does not have the ability to switch between multiple sources of power, the controller 232 may signal low power to the user when the power falls below a threshold, in case the user needs to intervene to replace one or more batteries of the power supply 232 to ensure continued operation of the UAV receptacle 102.

As noted above, the UAV receptacle 102 may grant access to a received package 106 by opening the doors 212a, 212b, extending the reception tray 222 to the receipt position again, and allowing a user to remove the package 106. This may be done in response to a command entered via the one or more security access mechanisms 216 or via an app on the user's device (e.g., received via the transceiver of the controller 230). The reception tray 222 may begin retracting to the storage position in response to a change detection by the sensor 226, a command from the one or more security access mechanisms 216, and/or a command from an app on the user's device to name just a few examples. Upon reaching the storage position, the doors 212a, 212b may automatically close (or, in embodiments where attached to the reception tray 222, close by virtue of the reception tray 222 retracting).

Figure 5A:
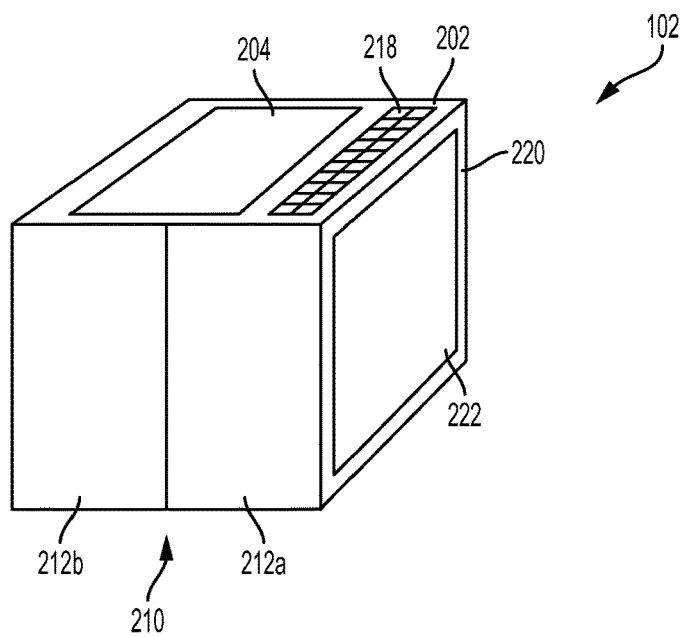
FIG. 5A is a block diagram of a front perspective view of an exemplary unmanned vehicle delivery receptacle according to aspects of the present disclosure.

In other embodiments (or in addition to the above), the housing 202 may further include an access door. FIG. 5A is a block diagram of a front perspective view of an exemplary UAV receptacle 102 according to aspects of the present disclosure. The housing illustrated 202 is similar to those discussed with respect to FIGS. 2-4 above, with the modifications as noted below.

As illustrated, the housing 202 may further include an access door 223 in one of the sides of the housing 202. As illustrated in FIG. 5A, the access door 223 is on the side 220 that is adjacent to the side 210 with the doors 212a, 212b. This is exemplary only. The access door 223 may be placed, where included, on any of the sides besides the side 210 that has the access door 212. The side on which the access door 223 is located may not include the controller 230 and/or the power supply 232, while in other embodiments the side with the access door 223 may include one or both where that particular side is left with a bezel (e.g., where the access door 223 does not occupy the entire area of the particular side).

In other embodiments, the access door 223 may define the entire side (in this example, side 220). Alternatively, the access door may be defined on the side that includes the one or more security access mechanisms 216. Therefore, the one or more security access mechanisms 216 may interact via the controller 230 (or independent of the controller 230) to control a lock on the interior of the housing 202 to secure the access door 223.

In some embodiments, the access door 223 may be sized on the side (e.g., side 220) to permit both manual user access as well as provide an interface between the housing 202 and an expansion container (e.g., by swinging up to open via hinges near the top 201 of the housing 202 to releasably connect to a receiving unit in the expansion container, or by complete removal in configurations when connected to the expansion container, etc.).

Figure 5B:
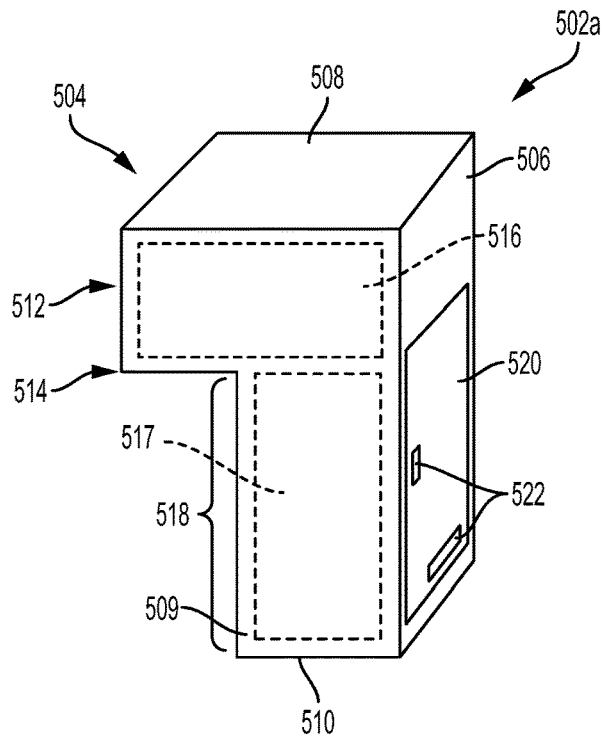
FIG. 5B is a block diagram of a front perspective view of an exemplary expansion container for an unmanned vehicle delivery receptacle according to aspects of the present disclosure.

FIG. 5B is a block diagram of a front perspective view of an exemplary expansion container 502a for UAV receptacle 102 according to aspects of the present disclosure. The expansion container 502a is designed to be an optional add-on to the UAV receptacle 102, for example for use by those who are heavy users of drone delivery (e.g., multiple packages expected on a given day). In other examples, the expansion container 502a may be integrally manufactured with the UAV receptacle 102.

The expansion container 502a illustrated in FIG. 5B includes a side 504, another side 506, top 508, a bottom 510, front 509, and a rear (from the view of the illustration in FIG. 5B). As illustrated, the side 504 is the side designed to interface with the housing 202 (such as the one illustrated in FIG. 5A). For example, the side 504 includes an opening 512 that has at least the same area as that of the access door 223 of the housing 202, and one or more couplers 514 to releasably connect to the side 220 of the housing 202 (e.g., where the two are not integrated with each other at manufacture).

From the side 504, the expansion container 502a may have an interior portion defining an upper portion 516 that may have a larger length than height, as well as an interior portion defining a lower portion 517. Although illustrated as distinct portions, upper portion 516 and lower portion 517 define an interior of the expansion container 502a and are called out separately herein merely for ease of discussion of embodiments of the present disclosure.

The side 506 may be the side that is opposite the side 504 that interfaces with the housing 202. This side 506 may include a retrieval door 520 located along some height for access to at least the lower portion 517 (and, in some embodiments, the upper portion 516). The retrieval door 520 may be attached to the side 506 via one or more hinges, slots, etc., so that the retrieval door 520 may allow access to the interior of the expansion container 502a as desired. The retrieval door 520 may include one or more handles 522. For example, where hinges are located on a side of the retrieval door 520, the handle 522 may be located toward an opposing side of the retrieval door 520. As another example, where hinges are located at a top or bottom of the retrieval door 520, the handle 522 may be located at an opposing bottom or top, respectively, of the retrieval door 520.

In other embodiments, the retrieval door 520 may comprise a rolling or sliding door, e.g. rolling or sliding up from the bottom 510 toward the top 508. Whatever the embodiment, the retrieval door 520 may be secured in the expansion container 502a via one or more locks on the interior of the expansion container 502a. The locks may be controlled by a physical key, another keypad, and/or the controller 230 (e.g., with app control of a user device) of the housing 202 where electrically connected (such as via the one or more couplers 514).

In use, the housing 202 may further include a box actuator that is located on an opposing interior surface of the access door 223. There may be a single box actuator with a sufficiently slim profile so as to not interfere with packages 106 while the reception tray 222 is in a storage position, or the box actuator may be multiple box actuators that operate in coordination with each other, again with sufficiently slim profile. When a package 106 is received and the reception tray 222 is back in the storage position, the controller 230 may direct the box actuator to actuate the package 106 currently on the reception tray 222 towards the expansion container 502a via the opening 512 and into the upper portion 516 (which may include, e.g., rollers or some other mechanism to encourage movement of the package 106 while actuated by the box actuator in the housing 202, thereby reducing the length that the box actuator must be).

In embodiments where the reception tray 222 includes sides or a sloped configuration to aid preventing bouncing, further mechanisms may be involved to facilitate transfer. For example, a side of the reception tray 222 that is proximal to the side of the housing 202 with the access door 223 may be formed of a pliable material that either extends and contracts with the movement of the reception tray 222 (such that the side is not present when the reception tray 222 is in the storage position so the package 106 may move freely towards the upper portion 516) or may fold down towards the opening 512 in response to reaching the storage position or upon application of force from the box actuator as transferred via the package 106 on the reception tray 222 at the time.

The box actuator may activate in any one or more of a variety of ways. For example, in embodiments where the expansion container 502a is coupled to the housing 202, the controller 230 may maintain a "busy" signal to indicate to any possible future drones 104 that delivery cannot yet be accomplished. Thus, in some embodiments the controller 230 may activate the box actuator automatically in response to the reception tray 222 reaching the storage position with the doors 212a, 212b closing. Once the package 106 is actuated into the upper portion 516 and has cleared the reception tray 222 (e.g., as noted by a change in detection signal from the sensor 226), the controller 230 may clear the "busy" signal to allow another delivery.

In other embodiments, the controller 230 may wait until an event occurs to trigger clearing of the reception tray 222 for another delivery. For example, a user may enter a command via an app on the user's device to clear the reception tray 222 (e.g., upon receipt of the notification of the delivery of the package 106 via the app). As another example, the controller 230 may trigger clearing of the reception tray 222 in response to detecting another drone 104 entering the defined range of the UAV receptacle 102.

After the package 106 enters the upper portion 516, the package 106 may continue its movement towards the lower portion 517, for example by way of gravity along the length 518 (that extends approximately the same amount as the length of the post 103 in some examples). In some embodiments, the lower portion 517 is simply an open area in which the packages 106 may fall and stack on top of each other. In other examples, a dampener may extend from the bottom 510 on the interior of the expansion container 502a to dampen the fall of the packages 106 (e.g., having a weight threshold with a spring effect, a cushion, some combination thereof, etc.). In some embodiments, the lower portion 517 may include an additional sensor to detect the presence of one or more packages 106 in the expansion container 502a, which may for example be in communication with the controller 230 to alert the user via the app, and/or with a physical indicator (e.g., light) on the expansion container 502a.

In some embodiments, a sensor may be used to prevent jamming of the system; for example, a light sensor may be used at the top of the lower portion 517 and/or at the opening 512. If the light sensor remains triggered after removing a package 106 from the reception tray 222, the controller 230 may utilize this information to notify the user via the app that the UAV receptacle 102 is full and/or notify delivery entities that no additional packages 106 may be received at that time (with a subsequent notification indicating when additional packages 106 may again be received).

Figure 5C:
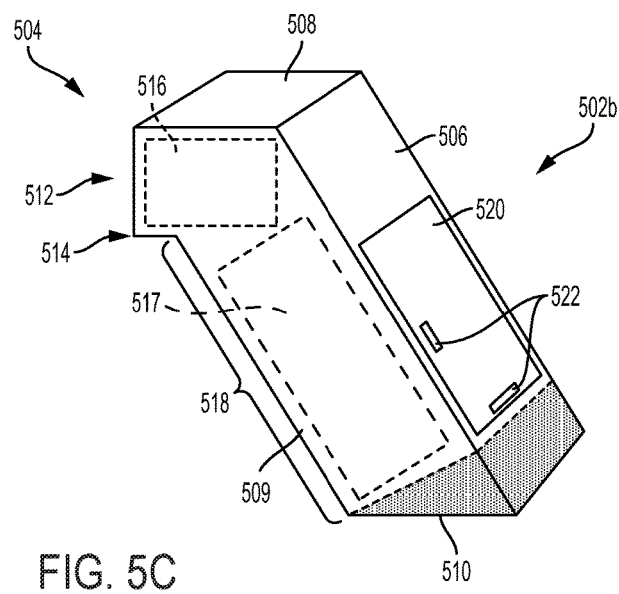
FIG. 5C is a block diagram of a front perspective view of an exemplary expansion container for an unmanned vehicle delivery receptacle according to aspects of the present disclosure.

The expansion container may have other alternative configurations, one of which is illustrated in FIG. 5C. FIG. 5C provides a block diagram of a front perspective view of an exemplary expansion container 502b for a UAV receptacle 102 according to aspects of the present disclosure. As there are several similarities between expansion container 502a and expansion container 502b, only those differences between the two will be discussed.

The primary difference lies in the orientation of the lower portion 517, which instead of being approximately perpendicular to the upper portion 516, lies at an obtuse angle thereto. This may aid in providing a more gradual descent for packages 106 when they are actuated off from the upper portion 516. At the bottom 510 of the expansion container 502b, a block portion 519 may be included to better orient the packages 106 for pickup after opening the retrieval door 520.

Figure 5D:
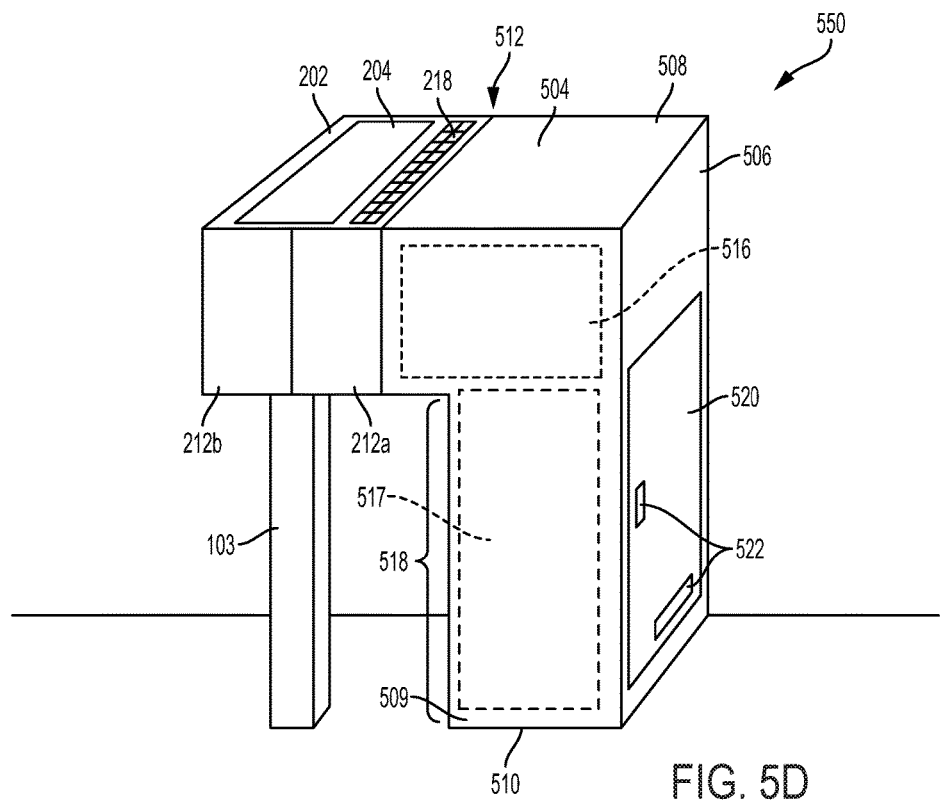
FIG. 5D is a block diagram of a front perspective view of an exemplary expansion container coupled to an unmanned vehicle delivery receptacle according to aspects of the present disclosure.

FIG. 5D is a block diagram of a front perspective view of an exemplary expansion container coupled to UAV receptacle according to aspects of the present disclosure. The combined apparatus 550 is illustrated based on the exemplary expansion container 502a introduced in FIG. 5B above as just one example for ease of illustration, though other expansion container embodiments may be used instead.

As illustrated, the housing 202 may be coupled to the expansion container 502a (e.g., via the couplings 514) to form a waterproof seal (e.g., via one or more gaskets, overlapping surfaces, etc.). As noted previously, the access door 223 may, in some embodiments, be fully removed from the housing 202 when coupling the expansion container 502a thereto. In other embodiments, the access door 223 may swing on one or more hinges into an extended position and coupled to a receiving end in the opening 512 of the expansion container 502a.

Figure 6:
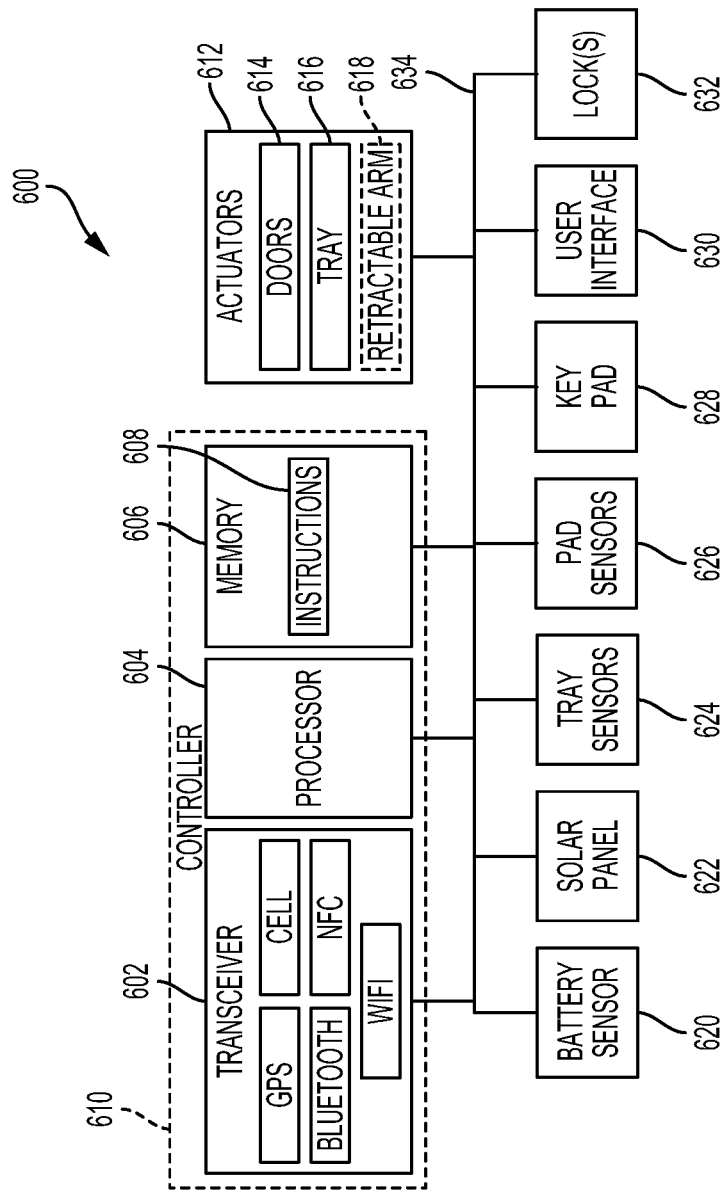
FIG. 6 is a block diagram of a control system of an exemplary unmanned vehicle delivery receptacle according to aspects of the present disclosure.

Turning now to FIG. 6, a block diagram of a control system 600 of an exemplary UAV receptacle 102 according to aspects of the present disclosure is illustrated. In some embodiments, the control system 600 includes the controller 103 discussed above. For example, the control system 600 may include a controller 610 (of which controller 103 is an example), one or more actuators 612, and multiple sensors and other inputs. These elements may be in direct or indirect communication with each other via the connection 634, which may illustrate one or more buses, one or more wired or wireless connections, etc.

Looking at the controller 610 in particular, it may include a transceiver 602, a processor 604, and a memory 606. Although illustrated as generally grouped together, e.g. part of the same physical structure of a controller 610, these components may be instead logically grouped together but be in physically distinct enclosures without departing from the scope of the present disclosure. As shown, the transceiver 602 may include a variety of different protocol-specific functions (which may correspond to distinct transceiver hardware/antenna, different software protocols for shared hardware, or some combination thereof). For example, the transceiver 602 may include a global navigation system such as a global positioning system (GPS). Although identified as GPS, this may alternatively be some other navigation system, including Galileo, GLONASS, BeiDou, or some other system that enables the controller 610 to determine geolocation information. The GPS functionality for the transceiver 602 may aid in unmanned vehicle delivery, for example.

Another function that the transceiver 602 may include is a Bluetooth protocol (whether Bluetooth or Bluetooth Low Energy). The transceiver 602 may utilize the Bluetooth protocol to communicate with other devices within range, for example the user's device (e.g., a cell phone, tablet, smartwatch, etc.) and/or a drone 104. Yet another function may be a near field communication (NFC) protocol that uses the transceiver 602 or a dedicated transceiver therefor. The NFC protocol may likewise be used for communicating with user's device and/or drone 104. For example, NFC may be used as an unlocking mechanism, e.g. the user activates the feature in an app on the user device, which is waved within a close proximity of the transceiver 602 near the housing 202 in order to activate unlocking of the housing 202.

Yet another function for the transceiver 602 may be a Wi-Fi protocol (e.g., 802.11) with the transceiver being dedicated thereto or shared. For example, the transceiver 602 may utilize Wi-Fi to communicate with drones 104 when within range (e.g., utilizing ad-hoc variants of the 802.11 protocol or via an access point nearby), with the user's device (same, ad-hoc or via access point), or with some remote system such as the delivery entity (a package delivery entity, a warehouse, etc.) via an access point. The transceiver 602 could additionally or alternatively include a cellular transceiver (either protocol only or distinct transceiver). The transceiver 602 may, via the cellular transceiver, communicate with the user's device, the drone 104, and/or delivery entity without requiring additional infrastructure provided by the user (e.g., access points like with Wi-Fi). The above different protocols/hardware of the transceiver 602 are exemplary—the transceiver 602 may include other additional protocols/hardware in order to facilitate communication with the user's device, drones 104, and/or delivery entities that operate the drones 104.

The processor 604 may have various features as a specific-type processor. For example, these may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the controller 230 introduced above. The processor 604 may also be implemented as a combination of computing devices, e.g., a combination of a DSP and a microprocessor, a plurality of microprocessors, one or more microprocessors in conjunction with a DSP core, or any other such configuration. Further, the processor 604 may represent a single core or processor, a multi-core processor, and/or multiple multi-core processors.

The memory 606 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some embodiments, the memory 606 may include a non-transitory computer-readable medium. The memory 606 may store instructions 608. The instructions 608 may include instructions that, when executed by the processor 604, cause the processor 604 to perform operations described herein with reference to a controller 230 in connection with embodiments of the present disclosure. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The control system 600 may further include the one or more actuators 612. For example, the one or more actuators 612 may include one or more door actuators 614. For example, each door 212a, 212b may have a respective actuator 612 controlled by the controller 610. Where the doors 212 are integrated with the reception tray 222, this may not be included. As another example, the one or more actuators 612 may include one or more reception tray actuators 616, used under the control of controller 610 to actuate the reception tray 222 (e.g., FIG. 2) into a reception position and back to a storage position. As yet another example, the one or more actuators 612 may include one or more retractable arm actuators 618. These are illustrated in dashed lines in FIG. 6 to illustrate that these actuators 618 may be included only where it is envisioned that the housing 202 may be coupled to an expansion container 502 (e.g., the 502*a* or 502*b* examples discussed above).

For any of the above actuators 612, they may take the form of solenoids, electric motors, hydraulic cylinders, pneumatic cylinders, and/or some other combination of motors depending on environment and application.

The control system 600 may include other data sources/ inputs/outputs coupled to the controller 610 and, some or all of each other. For example, battery sensor 620 may be one or more sensors that operate the status of the power source 232. Solar panel 622 may be a sensor and/or controller of the solar array 218 introduced above that is in communication with the controller 610. Tray sensors 624 may include the sensor 226 discussed above with respect to the reception tray 222, and therefore constitute one or more sensors attached to or integrated with the mesh material 224. The pad sensors 626 may include one or more sensors to detect a presence of a package 106 placed on a pickup pad 214 (e.g., FIG. 2).

The key pad 628 may be an embodiment of the one or more security access mechanisms 216 (e.g., FIG. 2) discussed above. These may be in communication with the controller 610 to control the one or more locks 632 (or in direct communication with the lock(s) 632) to limit operation of the one or more doors of the housing 202. The control system 600 may further include a user interface 630, for example a screen, one or more lights, trackpad, mouse, etc., and may be a part of the one or more security access mechanisms 216 or be physically and/or logically distinct therefrom. The user interface 630 may additionally be used to control the locks 632, actuation of one or more of the doors of the housing 202, and/or display information such as packages available, costs incurred for package delivery, etc.

Figure 7:
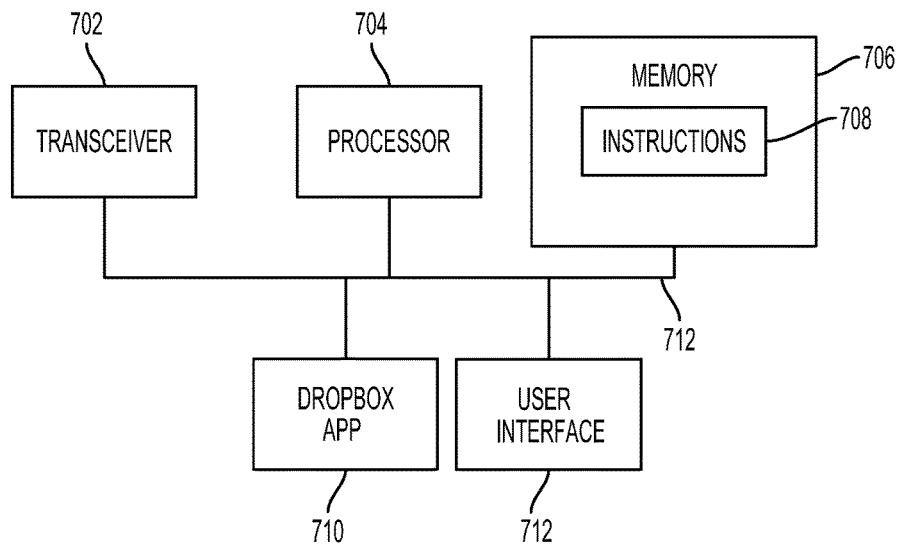
FIG. 7 is a block diagram of a user's device in communication with an exemplary unmanned vehicle delivery receptacle according to aspects of the present disclosure.

FIG. 7 is a block diagram of a user's device 700 in communication with an exemplary UAV receptacle 102 according to aspects of the present disclosure. The user's device 700 may be, for example, a cellular phone, a tablet, a laptop, a smartwatch, or some other computing device capable of communicating with the controller 230 of the UAV receptacle 102 according to embodiments of the present disclosure. The user's device 700 may include a transceiver 702, a processor 704, a memory 706, an app 710 (also referred to generically as a "dropbox app" for purposes of discussion), and a user interface (UI) 712. The UI 712 may assume any of a variety of input and/or output mechanisms, for example a screen, one or more lights, a trackpad, a mouse, etc. The user's device 700 may include other components that are not illustrated herein so as to focus on aspects of the present disclosure.

The transceiver 702 may include one or more protocol types, for example a Wi-Fi protocol (e.g., 802.11). For example, the transceiver 702 may utilize Wi-Fi to communicate with the UAV receptacle 102 and, in some embodiments, with the delivery entity or other centralized management system (for either the delivery entity, the entity providing the UAV receptacle 102, or both). The transceiver 702 may communicate with the other devices using the Wi-Fi protocol via an access point or directly. The transceiver 702 may additionally or alternatively operate according to a Bluetooth protocol (whether Bluetooth or Bluetooth Low Energy) for the same purposes. The transceiver 702 could additionally or alternatively include a cellular transceiver. The transceiver 702 may, via the cellular transceiver, communicate with the UAV receptacle 102, the drone 104, and/or delivery entity without requiring additional infrastructure provided by the user (e.g., access points like with Wi-Fi). The above different protocols/hardware of the transceiver 702 are exemplary—the transceiver 702 may include other additional protocols/hardware in order to facilitate communication.

The processor 704 may have various features as a specific-type processor. For example, these may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the user's device introduced above. The processor 704 may also be implemented as a combination of computing devices, e.g., a combination of a DSP and a microprocessor, a plurality of microprocessors, one or more microprocessors in conjunction with a DSP core, or any other such configuration. Further, the processor 704 may represent a single core or processor, a multi-core processor, and/or multiple multi-core processors.

The memory 706 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some embodiments, the memory 706 may include a non-transitory computer-readable medium. The memory 706 may store instructions 708. The instructions 708 may include instructions that, when executed by the processor 704, cause the processor 704 to perform operations described herein with reference to a user's device in connection with embodiments of the present disclosure.

According to embodiments of the present disclosure, communication with the UAV receptacle 102 may be coordinated/controlled via the dropbox app 710. The dropbox app 710 may be stored, for example, in the memory 706 as at least a subset of the instructions 708, and executed by the process 704. After installation of the dropbox app 710, communication may be established with an associated UAV receptacle 102 (e.g., set up at installation by the user). When a delivery is made to the UAV receptacle 102, the controller 230 of the UAV receptacle 102 may transmit a notification to the user's device 700, which is received and processed by the dropbox app 710. For example, the dropbox app 710 may cause a notification to be displayed via the UI 712 (e.g., a visual notification and/or audible alert).

The user may use the dropbox app 710 via the UI 712 to instruct the UAV receptacle 102 to unlock and/or open/close the reception tray 222. Further, the user may use the dropbox app 710 to cause the received package 106 to be pushed to an expansion container 502 in embodiments where that is included and coupled to the housing 202 of the UAV receptacle 102. The user may additionally use the dropbox app 710 to communicate with the delivery entity and/or provider of the UAV receptacle 102 (e.g., which the user is renting or has purchased on license to name some examples). For example, the user may initiate payment when a package 106 has been delivered or in preparation for delivery of a package 106 (e.g., where the user has agreed to payment for the delivery as opposed to the delivery entity).

Further, the user of the user's device 700 may utilize the dropbox app 710 to schedule pickup of an empty package 106 (and/or of a new package 106 that has a destination to another user/online retailer/etc.). This may operate in coordination with a sensor that detects the presence of the package 106 on the pickup pad 214 prior to pickup being scheduled with the entity providing the drone 104. As noted previously, to avoid false positives, the controller 230 in the housing 202 may delay alerting a pickup system (whether the delivery entity that had facilitated sending the package 106 or some third party recycling service, etc.) until it receives an additional input identifying the package 106 for pickup which is entered via the dropbox app 710. Thereafter, a pickup request may be signaled from the user's network to the appropriate retrieving party (whether the delivery entity or third party, etc.). The signal may be generated from the dropbox app 710, from the controller 230, some combination of both, etc.

Figure 8:
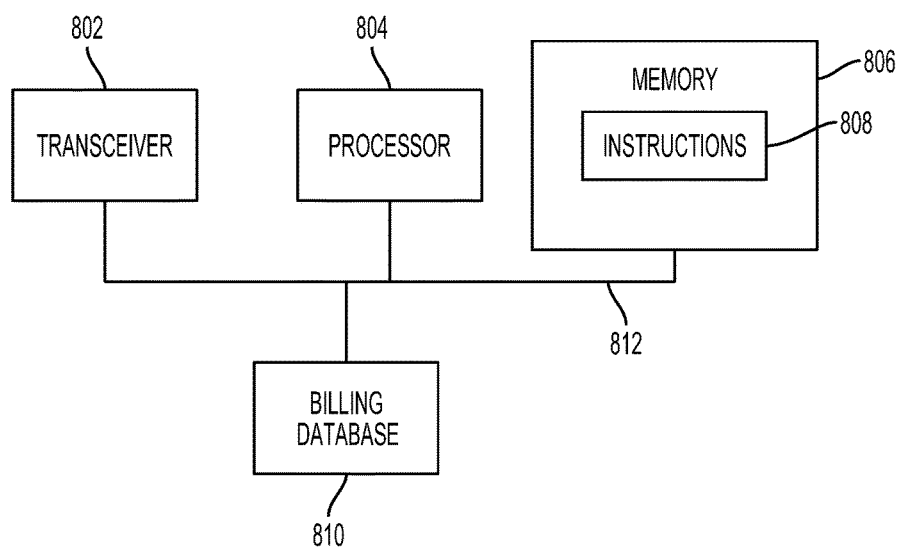
FIG. 8 is a block diagram of a control system of a server in communication with an exemplary unmanned vehicle delivery receptacle according to aspects of the present disclosure.

FIG. 8 is a block diagram of a server 800 in communication with an exemplary UAV receptacle 102 and a user's device 700 according to aspects of the present disclosure. The server 800 may include a transceiver 802, a processor 804, a memory 806, and a billing database 810. The server 800 may include other components that are not illustrated herein so as to focus on aspects of the present disclosure.

The transceiver 802 may include one or more protocol types, for example a Wi-Fi protocol (e.g., 802.11) as discussed above. For example, the transceiver 702 may utilize Wi-Fi to communicate with the UAV receptacle 102 and, in some embodiments, with the user's device 700. The transceiver 802 may include other additional protocols/hardware in order to facilitate communication, such as any of the examples provided above or other available protocols/hardware that enable communication to occur in furtherance of embodiments of the present disclosure.

The processor 804 may have various features as a specific-type processor. For example, these may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the user's device introduced above. The processor 804 may also be implemented as a combination of computing devices, e.g., a combination of a DSP and a microprocessor, a plurality of microprocessors, one or more microprocessors in conjunction with a DSP core, or any other such configuration. Further, the processor 804 may represent a single core or processor, a multi-core processor, and/or multiple multi-core processors.

The memory 806 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some embodiments, the memory 806 may include a non-transitory computer-readable medium. The memory 806 may store instructions 808. The instructions 808 may include instructions that, when executed by the processor 804, cause the processor 804 to perform operations described herein with reference to a management or control server in connection with embodiments of the present disclosure.

For example, the server 800 may include the billing database 810. According to embodiments of the present disclosure, the server 800 may be operated by the entity responsible for providing the UAV receptacle 102, and may be separate/distinct from the delivery entity (such as an online retailer). Thereby, the entity providing the server 800 and UAV receptacle 102 may facilitate drone deliveries according to embodiments of the present disclosure. In some examples, the delivery entity assumes responsibility for payment of services. For example, each time that a delivery is scheduled and/or completed, the server 800 may receive a notification from the delivery entity and/or the UAV receptacle 102. In response, the billing database 810 may be accessed to generate a bill for the use, either each time a use occurs, on a periodic basis that is tracked by the billing database (e.g., monthly), or to track a prepaid number of deliveries to name just a few examples.

In other examples, the user of the user's device 700 may have agreed to responsibility for payment of service via the UAV receptacle 102 and the corresponding dropbox app 710. In such scenarios, the same options may apply—either each time a delivery is scheduled or completed, or on a periodic basis, the server 800 may generate a bill based on the information stored in the billing database 810 and sent to a corresponding address for the user (e.g., an email address, a physical address, the dropbox app 710, etc.).

Figure 9:
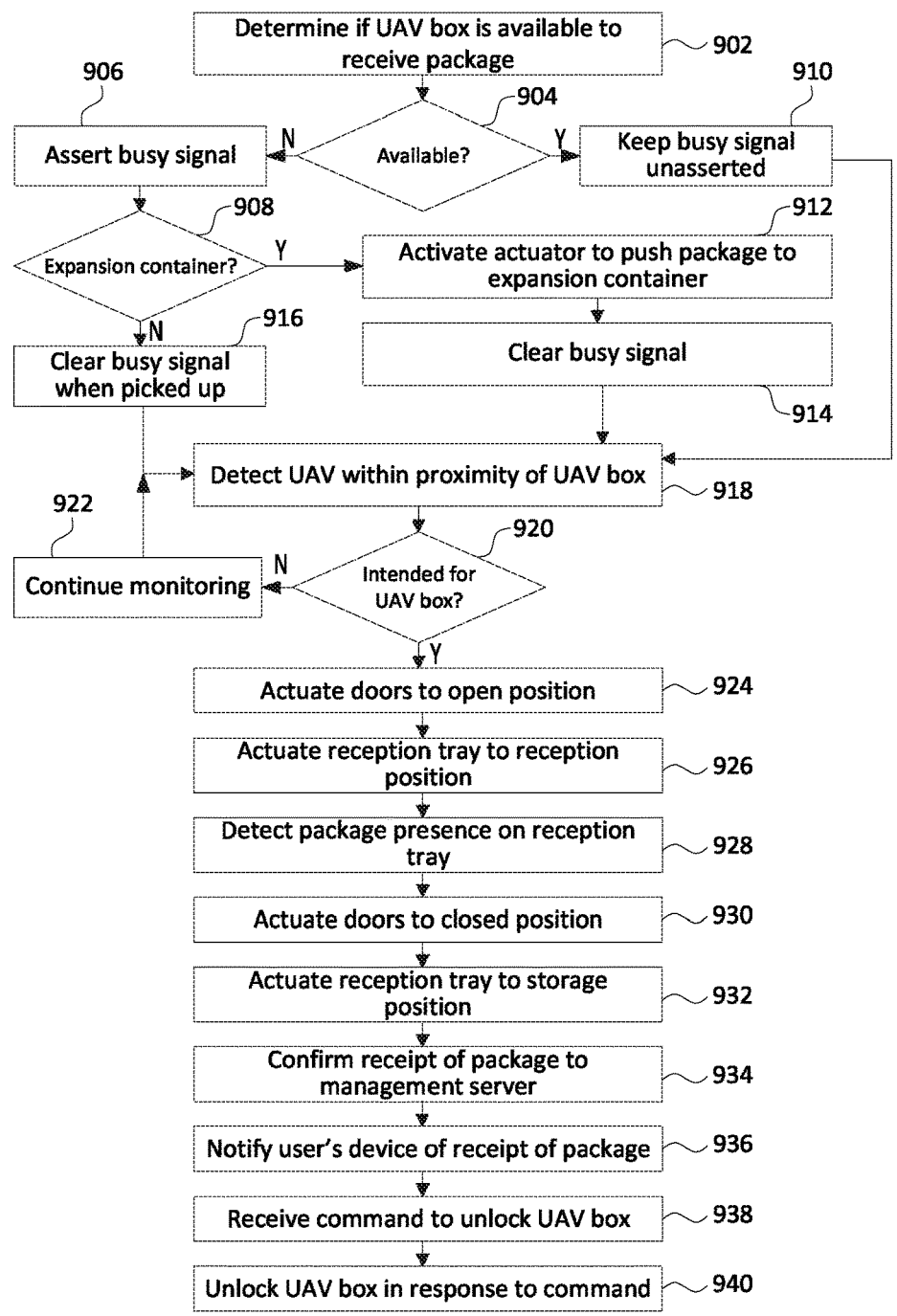
FIG. 9 is a flow diagram of an exemplary method of operating an exemplary unmanned vehicle delivery receptacle according to aspects of the present disclosure.

Turning now to FIG. 9, a flow diagram is illustrated of a method 900 for operating an exemplary UAV receptacle 102 according to aspects of the present disclosure. In an embodiment, the method 900 may be implemented by one or more processors of the controller 230 of the UAV receptacle 102, executing computer-readable instructions to perform the functions described herein. It is understood that additional steps can be provided before, during, and after the steps of method 900, and that some of the steps described can be replaced or eliminated for other embodiments of the method 900.

At block 902, the controller 230 determines whether the UAV receptacle 102 is available to receive a package 106.

At decision block 904, if the UAV receptacle 102 is not available, then the method 900 proceeds to block 906. For example, if a package 106 is currently in the reception tray 222, then the controller 230 is not available for receipt of a new package 106.

At block 906, the controller 230 asserts a "busy" signal, which may be transmitted to the delivery entity, the user's device 700, and/or a drone 104 that may come within a proximity of the UAV receptacle 102. Thus, drones 104 may be prevented from attempting delivery while this busy signal is asserted/on record with the delivery entity/etc.

At decision block 908, if the UAV receptacle 102's housing 202 is coupled with an expansion container 502 (e.g., as introduced in FIG. 5B), then the method 900 proceeds to block 912.

At block 912, the controller 230 activates one or more actuators (e.g., box actuators discussed above) to push the package 106 currently on the reception tray 222 into the expansion container 502.

At block 914, as a result of the controller 230 pushing the package 106 from the reception tray 222, the controller 230 (e.g., because the sensor 226 is no longer detecting presence of a package 106 thereon) clears the busy signal. This may include, for example, transmitting this clearing to the user's device 700 and the delivery entity so that drones 104 may again attempt deliveries to the UAV receptacle 102 when desired/scheduled.

Returning to decision block 908, if the UAV receptacle 102's housing 202 is not coupled with an expansion container 502, then the method 900 proceeds to block 916.

At block 916, the busy signal remains asserted until a user retrieves the package 106 currently on the reception tray 222 from the housing 202.

Returning now to decision block 904, if the UAV receptacle 102 is available (e.g., no package 106 is currently resting on the reception tray 222), then the method 900 instead proceeds to block 910.

At block 910, the controller 230 maintains the busy signal in an unasserted state, waiting upon a drone 104 to attempt delivery of a package 106.

From any of blocks 910, 914, and 916, the method 900 proceeds to block 918.

At block 918, the controller 230 detects a drone 104 entering a proximity of the UAV receptacle 102. The proximity may be a predefined distance from the housing 202 that may be measured based on GPS coordinates of the housing 202 as compared to the approaching drone 104, a time-of-flight measurement for one or more signals between the drone 104 and the UAV receptacle 102, or some other measurement or combination thereof.

At decision block 920, the controller 230 determines whether the drone 104 is attempting delivery intended for the UAV receptacle 102. This may be accomplished, for example, by transmitting a challenge (e.g., a query signal) to the drone 104 that is now within the proximity. If the drone 104 is scheduled to make a delivery to the UAV receptacle 102, then the drone 104 may provide a first, affirmative response. If, instead, the drone 104 is targeting a different UAV receptacle 102, then the drone 104 may provide a second, negative response.

In yet other embodiments, the delivery entity may have transmitted a notification to the user's device 700, and via the dropbox app 710 to the UAV receptacle 102, indicating that a delivery has been scheduled. The notification may further include an identifier of the particular drone 104 that has been scheduled to make the delivery. Therefore, the challenge discussed above may be a query for the drone 104's identifier, which may be compared against that provided in the notification to make a positive match.

Whatever the approach for confirming whether the drone 104 intends delivery for the UAV receptacle 102, if the response is the second, negative response (whether provided as such from the drone 104 itself or determined by the controller 230 based on the information obtained from the drone 104), then the method 900 proceeds to block 922.

At block 922, the controller 230 continues monitoring for a drone 104 to enter a proximity of the UAV receptacle 102.

Returning to decision block 920, if the response is the first, affirmative response, then the method 900 instead proceeds to block 924.

At block 924, the controller 230 causes the doors 212a, 212b (as illustrated in the prior figures; if the door is attached to the reception tray 222, then the method 900 block 924 may be combined with block 926) to open so as to allow the reception tray 222 an egress path.

At block 926, once the doors 212a, 212b are in the open position, the controller 230 causes the reception tray 222 to actuate from a storage position within the housing 202 to a reception position extended through the opening made by opening the doors 212a, 212b.

At block 928, the sensor 226 detects the presence of a package 106 dropped from the drone 104. This may be a detection of the act of the package 106 hitting the reception tray 222, the continued weight of the package 106 (e.g., a difference in weight), or some other related detection that identifies the package 106 as now resting on the reception tray 222.

At block 930, the controller 230 processes the detection from block 928 and instructs the actuator(s) for the reception tray 222 to actuate the reception tray 222 from the reception position back to the storage position. This may be done upon the sensor signal being received, in response to a confirmation message between the controller 230 and the drone 104 (e.g., a signal indicating the presence of the package 106 on the sensor 226 sent to the drone 104, the drone 104 confirming from its end that it released the package 106, etc.).

At block 932, the controller 230 instructs the actuator(s) for the doors 212a, 212b to actuate the doors 212a, 212b to the closed position (which may be combined with block 930 where the door is attached to the reception tray 222 in such embodiments).

At block 934, the controller 230 confirms receipt of the package 106 to the management server 800 and/or to one or more servers of the delivery entity that had sent the drone 104.

At block 936, the controller 230 notifies a user's device 700 associated with the user of the UAV receptacle 102, for example the dropbox app 710, of the receipt of the package 106.

At block 938, the controller 230 receives a command to unlock the UAV receptacle 102. This command may be received, for example, via the transceiver 602 of the controller 230 from the dropbox app 710 based on a command from a user entered via the UI 712. As another example, the command may be received from an input entered via the one or more security access mechanisms 216, as discussed above.

At block 940, the controller 230 unlocks the UAV receptacle 102 in response to the command received at block 938, thereby allowing access to the package 106 stored therein. In some embodiments, this unlocking may be of an access door 223 in the housing 202; in other embodiments, it may be unlocking and causing the reception tray 222 to extend out and back in for retrieval thereby; in yet other embodiments, this may be unlocking of the retrieval door 520 where an expansion container 520 is in use.

The method 900 may continue as laid out above for additional packages. As a result of the elements discussed above, embodiments of the present disclosure improve upon the delivery and protection of packages, both from theft and from inclement weather.

Figure 10:
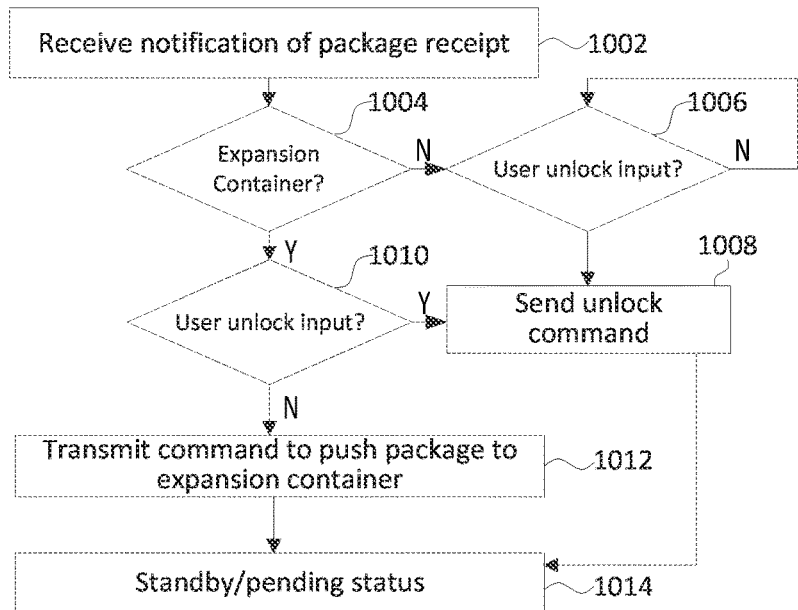
FIG. 10 is a flow diagram of an exemplary method of unmanned vehicle delivery from a user device perspective according to aspects of the present disclosure.

FIG. 10 is a flow diagram of an exemplary method 1000 of UAV receptacle delivery from a user device 700 perspective according to aspects of the present disclosure. In an embodiment, the method 1000 may be implemented by the dropbox app 710 via one or more processors 704 of the user's device 700, executing computer-readable instructions to perform the functions described herein. It is understood that additional steps can be provided before, during, and after the steps of method 1000, and that some of the steps described can be replaced or eliminated for other embodiments of the method 1000.

At block 1002, the dropbox app 710 receives notification of the UAV receptacle 102 receiving a package 106.

At decision block 1004, if the UAV receptacle 102's housing 202 is not coupled to an expansion container 502, then the method 1000 proceeds to decision block 1006.

At decision block 1006, if the user enters an unlock command via the UE 712 in the dropbox app 710, then the method proceeds to block 1008.

At block 1008, the dropbox app 710 causes an unlock command to be sent to the UAV receptacle 102 via the transceiver 702.

If instead, at decision block 1006, the user does not enter an unlock command, and there is no expansion container 502 at that time, then the method 1000 returns to decision block 1006 in a holding pattern until a command to unlock is received. That command may be received via the UI 712 of the user's device 700, or from an entry via the one or more security access mechanisms 216 at the housing 202, which may be passed on the dropbox app 710 as a notification.

Returning now to decision block 1004, if the UAV receptacle 102's housing 202 is coupled to an expansion container 502, then the method 1000 proceeds to decision block 1010.

At decision block 1010, if the dropbox app 710 receives an unlock command via the user interface 712, then the method 1000 proceeds to block 1008.

At block 1008, the dropbox app 710 causes an unlock command to be sent to the UAV receptacle 102 via the transceiver 702. In embodiments where the unlock command is entered via the one or more security access mechanisms 216 at the housing 202, then the method 1000 may skip blocks 1010 and 1008 and proceed to block 1014.

Returning to decision block 1010, if a command to unlock has not been received, then the method 1000 may proceed to block 1012.

At block 1012, a command may be sent from the dropbox app 710, via the transceiver 702, to the controller 230 to cause the controller 230 to actuate the box actuator and push the package 106 into the expansion container 502.

From either block 1012 or block 1008, the method 1000 then proceeds to block 1014, where the dropbox app 710 remains in standby mode until further notifications are received from the UAV receptacle 102, the delivery entity, and/or some other entity relating to delivery of packages 106.

Figure 11:
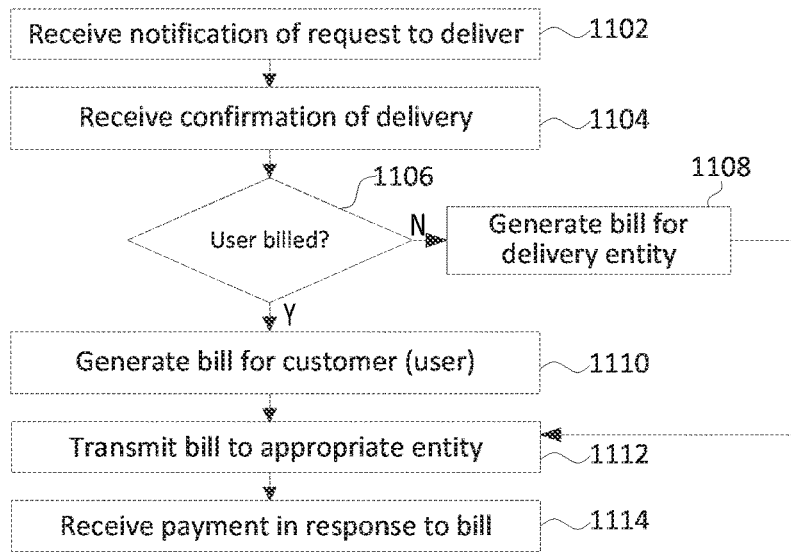
FIG. 11 is a flow diagram of an exemplary method of accounting for an unmanned vehicle delivery according to aspects of the present disclosure.

FIG. 11 is a flow diagram of an exemplary method 1100 of accounting for an exemplary UAV delivery according to aspects of the present disclosure. In an embodiment, the method 1100 may be implemented by the server 800, executing computer-readable instructions to perform the functions described herein. It is understood that additional steps can be provided before, during, and after the steps of method 1100, and that some of the steps described can be replaced or eliminated for other embodiments of the method 1100.

At block 1102, the server 800 receives a notification (e.g., via transceiver 802) of a request to deliver a package to a given UAV receptacle 102 associated with a user. This may be updated in a record in the billing database 810 and/or another tracking database.

At block 1104, the server 800 receives a confirmation of delivery of the package 106 associated with the notification of block 1102. This confirmation may be received from the drone 104 that made the delivery, the UAV receptacle 102 that received the delivery, or some combination thereof.

At decision block 1106, if the delivery entity has agreed to be billed, or is assigned to be the billed party by some other mechanism (including by default), then the method 1100 proceeds to block 1108.

At block 1108, the server 800 generates the bill directed to the delivery entity. The bill may be generated for the use on a per-use basis. In other examples, this may occur on a periodic basis that is tracked by the billing database 810 (e.g., monthly), or on a prepaid number of deliveries to name just a few examples.

Returning to decision block 1106, if the user associated with the UAV receptacle 102 has agreed to be billed, or is assigned to be the billed party by some other mechanism (including by default), then the method 1100 proceeds to block 1110.

At block 1110, the server 800 generates the bill directed to the user associated with the UAV receptacle 102. The bill may be generated according to one of the examples laid out above, for example.

From either block 1108 or block 1110, the method 1100 proceeds to block 1112.

At block 1112, the server 800 transmits the bill generated to the appropriate entity, whether the delivery entity per block 1108 or the user per block 1110.

At block 1114, the server 800 receives payment in response to the bill transmitted at block 1112 (e.g., after an appropriate passage of time, etc.).

In some embodiments, the computing system is programmable and is programmed to execute processes including the processes of methods 900, 1000, and/or 1100 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An unmanned vehicle delivery receiving apparatus, comprising:
    a door defining at least a portion of a side of a housing of the unmanned vehicle delivery receiving apparatus, the door configured to form a water-tight seal when shut;
    a reception tray within the housing that comprises a mesh base and a sensor configured to detect placement of a package on the reception tray as the reception tray is extended exterior to the housing;
    a transceiver configured to communicate with an unmanned vehicle within a proximity of the housing and assert a proximity signal in response to detecting the unmanned vehicle; and
    a controller configured to receive the proximity signal and, in response to the proximity signal:
        actuate the door from a shut position to an open position;

actuate the reception tray from a storage position within the housing to a reception position extended exterior to the housing through an opening in the housing created from the door in the open position;

actuate the reception tray from the reception position to the storage position in response to detecting receipt of a delivery package from the unmanned vehicle via the sensor asserting a detection signal; and actuate the door from the open position to the shut position.

2. The unmanned vehicle delivery receiving apparatus of claim 1, further comprising:

a pickup pad in a recess of an upper portion of the housing, the pickup pad sized to hold a box for pickup from a retrieving unmanned vehicle, wherein a pickup signal is asserted in response to placement of the box for pickup on the pickup pad.

3. The unmanned vehicle delivery receiving apparatus of claim 1, wherein:

the reception tray and the door are combined together such that an actuator coupled to the reception tray actuates the reception tray and the door, and the unmanned vehicle delivery receiving apparatus further comprises:

a solar panel attached to an upper portion of the housing and configured to provide power to a battery within the housing, wherein the battery is configured to supply power to the actuator coupled to the reception tray, actuators coupled to the sensor and the transceiver, and the controller.

4. The unmanned vehicle delivery receiving apparatus of claim 1, further comprising:

an expansion door defining at least a portion of a different side of the housing than the door, the expansion door configured to form a water-tight seal when shut and securely engage with an expansion reception box when open; and a retractable arm within the housing comprising a proximal end attached to an interior surface of the housing and a distal end configured to:

engage with a package surface of the package to push the package into the expansion reception box when engaged with the expansion reception box; and remain retracted within the housing when the expansion door is shut.

5. The unmanned vehicle delivery receiving apparatus of claim 1, wherein the controller is further configured to:

transmit, via the transceiver, a receipt signal to a management server in response to actuating the door from the open position to the shut position and the detection signal remaining asserted, the receipt signal triggering a notification from the management server to a user device associated with a user of the unmanned vehicle delivery receiving apparatus.

6. The unmanned vehicle delivery receiving apparatus of claim 1, further comprising:

a locking mechanism configured to maintain the door in the shut position and unlock in response to the controller receiving the proximity signal or in response to receiving a user input that matches a required credential.

7. The unmanned vehicle delivery receiving apparatus of claim 6, wherein the controller, in response to the locking mechanism unlocking in response to receiving the user input, is further configured to:

actuate the door to the open position;

actuate the reception tray from the storage position to the reception position with the delivery package for retrieval; and actuate the reception tray to the reception position and the door to the shut position in response to detecting a deassertion of the detection signal from the sensor.

8. An apparatus comprising:

a housing comprising a door, the door configured to form a water-tight seal in a shut position;

a reception tray maintained in the housing in a storage position and slidably connected to the housing to extend to a reception position external the housing, the reception tray comprising a mesh base and a reception tray sensor configured to assert a detection signal in response to a delivery;

a proximity sensor configured to detect an unmanned vehicle that enters a proximity of the apparatus and assert a proximity signal in response thereto;

a transceiver configured to communicate with a management server that is separate from the apparatus in response to detecting receipt of a package from the unmanned vehicle and assertion of the detection signal by the reception tray sensor; and a controller configured to assert a door open actuation signal to transition the door from the shut position to an open position in response to the assertion of the proximity signal, a tray actuation signal to transition the reception tray to the reception position after the door reaches the open position, and a reception signal in response to detecting the receipt of the package and the assertion of the detection signal.

9. The apparatus of claim 8, wherein:

the transceiver is further configured to communicate a challenge to the unmanned vehicle in response to the proximity signal being asserted and receive a response to the challenge from the unmanned vehicle, the response comprising a positive response for a package delivery and a negative response for no delivery, and the controller is further configured to assert the door open actuation signal based on the response being the positive response.

10. The apparatus of claim 8, wherein:

the transceiver is further configured to receive a package delivery signal from the unmanned vehicle in response to delivery of the package, and the controller is further configured to delay transmitting the reception signal to the management server until both the detecting the receipt of the package and receipt of the package delivery signal occur.

11. The apparatus of claim 8, wherein the transceiver is further configured to:

transmit a notification to a user device associated with, and separate from, the apparatus in response to the detecting the receipt of the package.

12. The apparatus of claim 8, wherein the reception tray and the door are combined together such that an actuator coupled to the reception tray actuates the reception tray and the door, and the door open actuation signal and tray actuation signal comprise a single actuation signal to transition the combined reception tray and door to the reception position.

13. The apparatus of claim 8, further comprising:

a solar panel attached to the housing and configured to provide power to a battery associated with the housing;

a pickup pad located in a first recess of an upper portion of the housing; and a stand housing located in a second recess of a lower portion of the housing, the stand housing configured to couple with a stand to support the housing above a surface.

* * * * *